March 1, 1949. F. W. O'CONNOR 2,463,300
SAFETY FENDER DEVICE FOR CARS AND BUSES
Filed Feb. 20, 1948 2 Sheets-Sheet 1
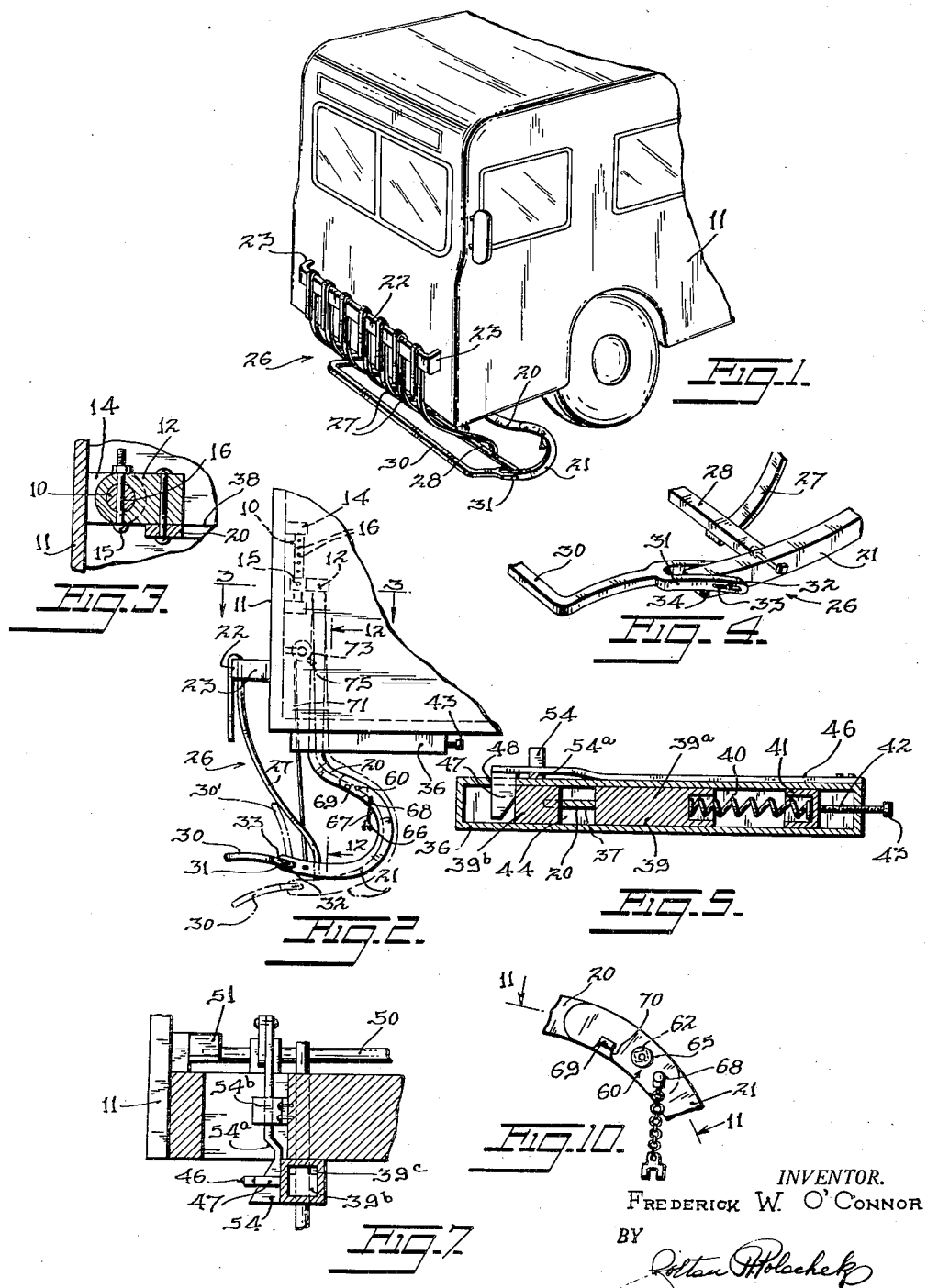
INVENTOR.
FREDERICK W. O'CONNOR
BY
ATTORNEY March 1, 1949.  F. W. O'CONNOR  2,463,300
SAFETY FENDER DEVICE FOR CARS AND BUSES
Filed Feb. 20, 1948  2 Sheets-Sheet 2
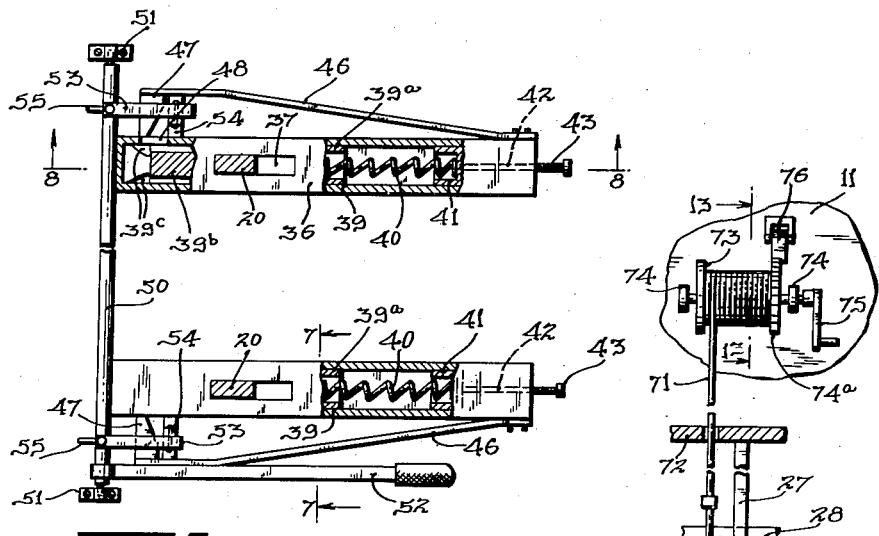
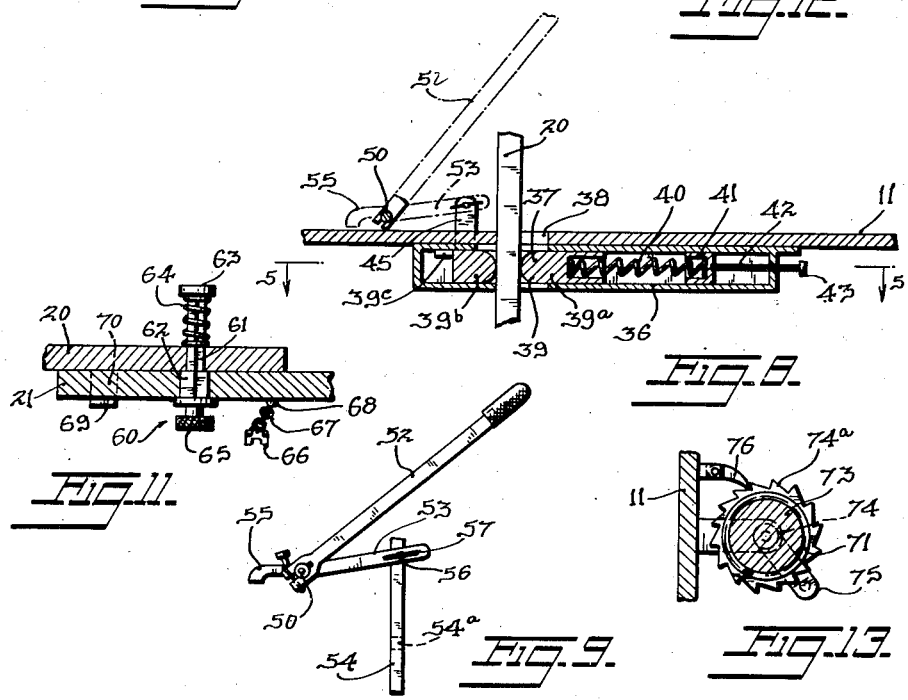
INVENTOR.
FREDERICK W. O'CONNOR
BY
ATTORNEY Patented Mar. 1, 1949

2,463,300

UNITED STATES PATENT OFFICE 2,463,300

SAFETY FENDER DEVICE FOR CARS AND BUSES

Frederick W. O'Connor, Bronx, N. Y.

Application February 20, 1948, Serial No. 9,716

8 Claims. (Cl. 293—15)

This invention relates to new and useful improvements in bus fenders, and constitutes an improvement of the fender disclosed in my earlier application Serial No. 596,306 filed May 28, 1945.

More particularly, the invention proposes a bus fender to be mounted at the front of a bus, partially on the front bumper thereof. It is proposed to so arrange the bus fender as to catch persons, animals and objects which may be in the path of the bus so as to prevent the bus from running over them.

Fenders of the type proposed by this invention are disclosed in my earlier application referred to above; however, the earlier construction has been found to be objectionable as the fender of that disclosure protrudes considerably beyond the front of the bus rendering the bus difficult to maneuver in traffic and especially when the bus rounds a corner on narrow city streets.

To overcome the objection to the prior construction, the present invention proposes the construction of a bus fender located entirely beneath the front end of the bus forward of the front wheels and which has no part thereof projected beyond the front bumper normally mounted on such busses. With the bus fender so located, the bus is no more difficult to maneuver than a bus which does not have such a fender and yet the fender is present for protection of pedestrians who may be accidentally hit by the bus while in motion.

An object of the present invention is to provide a new and improved bus fender, as aforesaid, characterized by having a pair of spaced side vertical members adapted to be mounted on the sides of the front of the inside of the bus, and adjustable supporting collars which support side arms extending downwardly and passing through the floor of the bus, the arms having forwardly extending bottom portions. It is proposed that these side arms be pivotally mounted on the collars.

The invention further proposes a bumper for the front of the bus having arms extending through vertical slots in the bus and being connected with the side arms mentioned in the previous paragraph. A support member is mounted on and between the side arms and bus bumper. This support member is in the nature of a guard made of a plurality of flexible metal straps spaced from each other and capable of supporting a person, animal or other object.

It is furthermore proposed to mount a pair of casings upon the bottom side of the floor of the bus, which casings are provided with passages through which the side arms pass. Resilient shock-absorbing means are disposed in the casings indirectly urging the side arms forwardly and yieldingly resisting their rearward movement. Each casing has a latch mechanism for indirectly catching and holding the side arms in their rear positions. Means are provided for releasing said latches.

An important feature of the new and improved bus fender is that the support member which catches and supports a person, animal or other object, is resiliently maintained in a forward position, and is capable of moving rearwardly a short distance when it encounters an object. This rearward motion cushions the impact. It is also proposed to pivotally mount the side arms upon the aforementioned collars so that there is a tendency for the support member to move downwardly to decrease the distance between it and the ground for preventing an object which strikes the support member and drives it rearwardly from passing beneath the fender and thus beneath the bus.

Still another object of the present invention proposes constructing the exposed bottom ends of the side arms of separate sections releasably locked together so that the exposed free ends of the arms may be released to be drawn upwardly into an operative position by a novel raising mechanism, so as not to interfere with the forward motion of the bus when moving through deep snow.

It is still another object of this invention to construct a bus fender which is simple and durable and which may be manufactured and sold at a reasonable cost for installation as standard equipment on new busses or for installation on existing busses.

For further comprehension of the invention and of the object and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of the front of a bus equipped with a bus fender constructed in accordance with this invention.

Fig. 2 is a fragmentary enlarged side elevational view of Fig. 1.

Fig. 3 is a fragmentary enlarged horizontal sectional view taken on the line 3—3 of Fig. 2.

Fig. 4 is a fragmentary enlarged detailed view of a portion of Fig. 1.

Fig. 5 is a fragmentary vertical sectional view taken on the line 5—5 of Fig. 8, but illustrating the latches in operative position.

Fig. 6 is a plan view of a portion of the fender detached from the bus and showing the latch mechanism and the operating means therefor.

Fig. 7 is a transverse sectional view on the line 7—7 of Fig. 6.

Fig. 8 is a longitudinal sectional view on the line 8—8 of Fig. 6.

Fig. 9 is a side view of the latch releasing and locking cross shaft mechanism standing alone.

Fig. 10 is an enlarged view of a portion of Fig. 2 showing the latch securing together the side arm portions.

Fig. 11 is a sectional view taken on the line 11—11 of Fig. 10.

Fig. 12 is an enlarged partial vertical sectional view taken on the line 12—12 of Fig. 2.

Fig. 13 is a sectional view taken on the line 13—13 of Fig. 12.

The bus fender, in accordance with this invention, includes a pair of spaced side vertical members 10 mounted within the front of a bus 11. Collars 12 are adjustably mounted upon the side members 10. The side members 10 are in the nature of vertical rods. They are supported at the top and bottom by brackets 14. The collars 12 are slidably mounted on the rods 10. Fastening elements 15 are mounted upon the collars 12 and are cooperative with groups of openings 16 formed in the rods 10 by which the collars may be held in various elevated positions on the rods or side members 10.

Side arms 20 are pivotally mounted upon said collars 12 and extend downwardly and pass through openings in the floor of the bus 11 and have forwardly extending bottom portions 21. A bumper 22 for the front of the bus 11 is provided with side arms 23 attached to the front wall of the bus 11.

A support member 26 is mounted on and between the side arms 23 and said bumper 22. It is deeply concave and basket-like for receiving an object hit by the bus. The support member 26 is formed from a plurality of flexible metal strips 27 which have their top ends slidably engaged over the bumper 22 and their bottom ends connected to a transverse bar 28 which is turnably mounted between the side arms 20. Strips 27 can bend and slide upwardly relative to the bumper 22 to permit the raising of portions 21, as will be hereinafter described.

A pivotal extension 30 is mounted upon the front ends of the forwardly extending bottom portions 21 of the side arms 20. This extension 30 is in the shape of a yoke. Its arms are formed with fork portions 31 which engage the front ends of the portions 21 of the side arms 20. Pins 32 project from the portions 21 and engage slots 33 formed in the fingers of the forks 31. The extension 30 may assume a forward position as illustrated by the full lines in Figs. 1 and 2, or it may be pivoted rearwardly as indicated by the dot and dash lines 30' in Fig. 2. Lugs 34 on the extremities of the forwardly extending bottom portions 21 engage the bottom faces of the forks 31 when the extension 30 is in its forward position. These lugs 34 serve to support the extension 30 in a substantially horizontal position, as illustrated in Fig. 2.

A pair of hollow casings 36 are mounted upon the bottom of the bus 11 and are formed with superimposed passages 37 through which said side arms 20 pass. The floor of the bus 11 is formed with passages 38 through which the side arms 20 pass. Resilient means is disposed within each of the casings 36 for urging the side arms 20 forward. These resilient means include plunger-like members 39 slidably mounted in the casings 36 and provided with passages 44 through which said side arms 20 pass. Each member 39 consists of a rear portion $39^a$ and a forward portion $39^b$ held together by hooks $39^c$ secured to their rear in the portions $39^a$ and over-hooking the portions $39^b$. The hooks $39^c$ can be spread to release portions $39^b$ when desired for separating portions $39^a$ and $39^b$.

The plunger-like members 39 are urged forwardly against the side arms 20 by expansion springs 40. These expansion springs 40 act against adjustable back stops 41. The back stops 41 are connected with screws 42 which are threadedly mounted through the back ends of the casings 36. The front ends of the screws 42 are rotatively associated with the back stops 41. The screws 42 have heads 43 by which they may be turned for controlling the tension of the springs 40. The front and back ends of the passages 44 are rounded so that the side arms 20 are free to pivot about their pivotal top ends.

Latches are provided on the casings 36 for catching and holding the plunger-like members 39 and so indirectly the side arms 20 in their rear positions. Each of these latches includes a leaf spring 46. These springs 46 are mounted upon the sides of the casings 36 and have bolts 47 mounted on their front ends and extendable through openings 48 in the sides of the casings 36 for engaging in front of the front end of the forward portions $39b$ when the plunger members 39 are moved rearwardly.

The latches are associated with releasing means. These releasing means include a cross shaft 50 extended across the interior of the bus 11 and journalled in bearings 51. A handle 52 for turning the cross shaft extends radially therefrom. The bearings 51 are mounted on top of the bus floor and the handle 52 preferably extends along the driver's seat so that it can be quickly manipulated by the bus driver.

Arms 53 extend from each end of the cross shaft toward the adjacent casings 36. Each arm has pivoted to its free end a wedge 54 having an upper portion $54^a$ (see Fig. 7) which fits between the spring 46 and the adjacent face of the casing 36. The upward pivoting of the handle 52 is limited by a dog 55 on each arm 53 so that the wedges cannot be withdrawn from their lateral position relative to the springs 46, the dogs 55 abutting the bus floor at the limit of upward pivoting of the handle 52.

As shown in Fig. 7, the vertical portions of the wedges are slidably disposed for vertical movement in brackets $54^b$ mounted in openings in the floor of the bus 11, through which the wedges pass. The top ends of the wedges 54 carry pins 56 which engage elongated slots 57 formed in the free ends of the arms 53. The pin and slot arrangement insures vertical movement of the wedges notwithstanding arcuate movement of the free ends of the arms 53 about the turning center of the cross shaft 50.

When the handle 52 is moved upwardly, the wedges 54 will pry the springs 46 away from the sides of the casings 36 and so move the bolts 47 into their inoperative positions, releasing the plunger members 39 and the members 20 for forward movement.

The forwardly extending bottom portions 21 are secured to the bottom ends of the side arms 20 by pivot pins 60 which also serve as latches for locking the bottom portions 21 against pivotal movement relative to the side arms 20. The pivot pins 60 have square portions 61 engageable in complementary square openings in the ends of the side arms 20. The square portions 61 continue into larger square portions 62 normally housed within complementary square openings in the adjacent ends of the bottom portions holding the arms 20 and bottom portions 21 against pivoting. The outer end of the square portions 61 are provided with heads 63 and expansion springs 64 on the square portions 61 operated between the heads 63 and the adjacent faces of the side arms 20 urging the pins 60 into positions in which the square portions 61 and 62 will be engaged in their respective openings. The outer end of the square portion 62 continues into a knob 65 by which the pin 60 may be pulled disengaging the square portion 62 from its respective square opening in the bottom portion 21 freeing the same to be pivoted relative to the arm 20.

A substantially U-shaped keeper element 66 mounted on one end of a piece of chain 67 is engageable between the inner end of the square portion 62 and the adjacent face of the bottom portion 21 for holding the pin 60 in the inoperative position in which the square portion 62 is disengaged from its opening in the bottom portion 21. There is a keeper element 66 for each of the side arms, and the free ends of the chains 67 are attached to the bottom portions 21 by means of pins 68 at points adjacent the pins 60.

A lug 69 extends from the face of the side arm 20 and is engageable in a corresponding cutout 70 in the edge of the bottom portion 21 limiting the bottom portions to upward pivoting only.

Means is provided in the inoperative position of the pins 60 for raising the bottom portions 21 and the extension 30 so as not to interfere with the forward motion of the bus when operating in deep snow. This raising means is characterized by a cable 71 having one end secured about an intermediate portion of the transverse bar 28 of the support member 26. The other end of the cable passes upwardly through an opening 72 formed in the floor of the bus 11 and is wound on a drum 73. The drum 73 is rotatively supported in brackets 74 mounted on the front wall of the bus 11 and the drum is provided with a handle 75 by which the drum 73 may be manually rotated by the driver for winding and unwinding the cable 71. One flange of the drum 73 is provided with ratchet teeth 74$^a$ engageable by a pawl 76 for holding the drum in a desired position against the downward pull on the cable 71.

When the latches holding the bottom portions 21 against pivotal movement have been released, the drum may be turned to draw upwardly on the cable 71 and raise the bottom portions into an upper inoperative position free of any snow on the ground. The pawl 76 will function to retain the bottom portions 21 in the desired raised position until such time as the pawl 76 is disengaged from the ratchet teeth 74$^a$, when the drum is free to be rotated in the opposite direction to lower the bottom portions 21. When the cable 71 is not holding the bottom portions 21 in a raised position, it will be appreciated that it will have to be left in a sufficient slack position so as not to interfere with normal operation of the fender.

The operation of the new and improved bus fender may be understood from the following:

Should the support member 26 strike an object while the bus 11 is moving forward, the support member 26 will catch and support the object. However, the force of impact and the weight of the object will force the support member 26 rearwardly, causing the side arms 20 to pivot rearwardly about their pivotal top ends. The side arms 20 will indirectly compress the springs 40, absorbing the shock of impact and dampening same. The front ends 39$^b$ of the plungers will be moved rearwardly so that the bolts 47 engage across the front end portions 39$^b$, holding the plunger-like members 39 in their rear positions, preventing recoil and holding the portions 21 in contact with the road.

When the object is removed from the support member 26, the fender may be reset by pulling up the handle 52. This will lower the arms 53 and wedges 54, the wedges 54 prying outwardly the springs 46 moving the bolts 47 outwardly and releasing the plunger-like members 39. The springs 40 will urge the plunger-like members 39 into their forward positions. The handle 52 is then reset, that is, lowered and the fender is now ready to operate again.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent, is:

1. A bus fender, comprising a pair of spaced side vertical members for mounting interiorly on the sides of the front of a bus, collars adjustably mounted on said side members, side arm pivotally mounted on said collars and extending downwardly for passing through the floor of said bus and having forwardly extending bottom portions, a bumper for the front of said bus and having arms secured to the bus, a pair of casings for mounting on the bottom of said bus and having passages through which said side arms pass, resilient means within said casings for urging said side arms forwardly, a laterally moving spring-actuated latch for each of said casings for catching and holding the side arms in rear positions when they have been moved rearwardly against the yielding resistance of said springs by impact against said side arms, and means for releasing each of said latches including a wedge for retracting each of said latches against the resistance of its said spring, a cross shaft journalled on the top of the floor of the bus, a single handle for rocking said cross shaft, and arms rigid with said cross shaft and pivoted to each of said wedges for actuating same, said forwardly extending bottom portions of said side arms being located entirely beneath the bus in front of the front wheels.

2. A bus fender, comprising a pair of spaced side vertical members for mounting interiorly on the sides of the front of a bus, collars adjustably mounted on said side members, side arms pivotally mounted on said collars and extending downwardly for passing through the floor of said bus and having forwardly extending bottom portions, a bumper for the front of said bus and having arms secured to the bus, a pair of casings for mounting on the bottom of said bus and having passages through which said side arms pass, resilient means within said casings for urging said side arms forwardly, a laterally moving spring-actuated latch for each of said casings for catching and holding the side arms in rear positions when they have been moved rearwardly against the yielding resistance of said springs by impact against said side arms, and means for releasing each of said latches including a wedge movable vertically and upwardly for retracting each of said latches against the resistance of its said spring, a cross shaft journalled on the top of the floor of the bus, a single handle for rocking said cross shaft, and arms rigid with said cross shaft and pivoted to each of said wedges for forcing said wedges upwardly to release said latches and for lowering said wedges to reset said latches, said forwardly extending bottom portions of said side arms being located entirely beneath the bus in front of the front wheels.

3. A bus fender, comprising a pair of spaced side vertical members for mounting interiorly on the sides of the front of a bus, collars adjustably mounted on said side members, side arms pivotally mounted on said collars and extending downwardly for passing through the floor of said bus and having forwardly extending bottom portions, a bumper for the front of said bus and having arms secured to the bus, a pair of casings for mounting on the bottom of said bus and having passages through which said side arms pass, resilient means within said casings for urging said side arms forwardly, a laterally moving spring-actuated latch for each of said casings for catching and holding the side arms in rear positions when they have been moved rearwardly against the yielding resistance of said springs by impact against said side arms, and means for releasing each of said latches including a wedge movable vertically and upwardly for retracting each of said latches against the resistance of its said spring, a cross shaft journalled on the top of the floor of the bus, a single handle for rocking said cross shaft, and arms rigid with said cross shaft and pivoted to each of said wedges for forcing said wedges upwardly to release said latches and for lifting said wedges to reset said latches, and means for limiting the rocking of said cross shaft to limit the vertical upward movement of said wedges, said forwardly extending bottom portions of said side arms being located entirely beneath the bus in front of the front wheels.

4. A bus fender, comprising a pair of spaced side vertical members for mounting interiorly on the sides of the front of a bus, collars adjustably mounted on said side members, side arms pivotally mounted on said collars and extending downwardly for passing through the floor of said bus and having forwardly extending bottom portions, a bumper for the front of said bus and having arms secured to the bus, a pair of casings for mounting on the bottom of said bus and having passages through which said side arms pass, resilient means within said casings for urging said side arms forwardly, a laterally moving spring-actuated latch for each of said casings for catching and holding the side arms in rear positions when they have been moved rearwardly against the yielding resistance of said springs by impact against said side arms, and means for releasing each of said latches including a wedge for retracting each of said latches against the resistance of its said spring, a cross shaft journalled on the top of the floor of the bus, a single handle for rocking said cross shaft, and arms rigid with said cross shaft and pivoted to each of said wedges for actuating same, said forwardly extending bottom portions of said side arms being located entirely beneath the bus in front of the front wheels, said forwardly extending bottom portions being separately formed, and pivot pins attaching said bottom portions to said side arms and in one position limiting pivoting of said bottom portions and in a second position freeing the bottom portions for pivotal movement.

5. A bus fender, comprising a pair of spaced side vertical members for mounting interiorly on the sides of the front of a bus, collars adjustably mounted on said side members, side arms pivotally mounted on said collars and extending downwardly for passing through the floor of said bus and having forwardly extending bottom portions, a bumper for the front of said bus and having arms secured to the bus, a pair of casings for mounting on the bottom of said bus and having passages through which said side arms pass, resilient means within said casings for urging said side arms forwardly, a laterally moving spring-actuated latch for each of said casings for catching and holding the side arms in rear positions when they have been moved rearwardly against the yielding resistance of said springs by impact against said side arms, and means for releasing each of said latches including a wedge for retracting each of said latches against the resistance of its said spring, a cross shaft journalled on the top of the floor of the bus, a single handle for rocking said cross shaft, and arms rigid with said cross shaft and pivoted to each of said wedges for actuating same, said forwardly extending bottom portions of said side arms being located entirely beneath the bus in front of the front wheels, said forwardly extending bottom portions being separately formed, and pivot pins attaching said bottom portions to said side arms and in one position limiting pivoting of said bottom portions and in a second position freeing the bottom portions for pivotal movement, and lugs on the side arms engaging complementary openings in the bottom portions limiting pivoting of the bottom portions to an upward direction only.

6. A bus fender, comprising a pair of spaced side vertical members for mounting interiorly on the sides of the front of a bus, collars adjustably mounted on said side members, side arms pivotally mounted on said collars and extending downwardly for passing through the floor of said bus and having forwardly extending bottom portions, a bumper for the front of said bus and having arms secured to the bus, a pair of casings for mounting on the bottom of said bus and having passages through which said side arms pass, resilient means within said casings, for urging said side arms forwardly, a laterally moving spring-actuated latch for each of said casings for catching and holding the side arms in rear positions when they have been moved rearwardly against the yielding resistance of said springs by impact against said side arms, and means for releasing each of said latches including a wedge for retracting each of said latches against the resistance of its said spring, a cross shaft journalled on the top of the floor of the bus, a single handle for rocking said cross shaft, and arms rigid with said cross shaft and pivoted to each of said wedges for actuating same, said forwardly extending bottom portions of said side arms being located entirely beneath the bus in front of the front wheels, said forwardly extending bottom portions being separately formed, and pivot pins attaching said bottom portions to said side arms and in one position limiting pivoting of said bottom portions and in a second position freeing the bottom portions for pivotal movement, and means within the bus for raising the forwardly extending bottom portions in the second position of the pivot pins.

7. A bus comprising a floor, a front wall, a substantially L-shaped fender having vertical members pivoted to said front wall above said floor, said members depending through said floor and supporting a basket-like bottom of said fender, said fender being adapted to rock rearwardly, a casing secured to the bottom of said floor at each vertical member, a plunger slidable in each of said casings, said vertical members passing vertically through said casings and plungers, spring means for yieldingly urging said plungers and vertical members forwardly, a latch for locking said plungers and vertical members in rearward position including laterally movable parts adapted to pass in front of said plungers when said plungers move rearwardly, blocking their return, spring means for urging said parts laterally toward said plungers including a leaf spring secured at one end to each of said parts and at its other end to the correlated casing, and means for releasing said latches including a cross rocker shaft on said bus floor, means for rocking said shaft, vertically movable wedges adapted to be forced between each leaf spring and its said casing to effect lateral movement of its said latch part away from the correlated plunger, and arms rigid with said cross shaft and pivoted to said wedges for actuating same, said basket-like bottom being located beneath the bus in front of the front wheels.

8. A bus comprising a floor, a front wall, a substantially L-shaped fender having vertical members pivoted to said front wall above said floor, said members depending through said floor and supporting a basket-like bottom of said fender, said fender being adapted to rock rearwardly, a casing secured to the bottom of said floor at each vertical member, a plunger slidable in each of said casings, said vertical members passing vertically through said casings, and plungers, spring means for yieldingly urging said plungers and vertical members forwardly, a latch for locking said plungers and vertical members in rearward position including laterally movable parts adapted to pass in front of said plungers when said plungers move rearwardly, blocking their return, spring means for urging said parts laterally toward said plungers including a leaf spring secured at one end to each of said parts and at its other end to the correlated casing, and means for releasing said latches including a cross rocker shaft on said bus floor, means for rocking said shaft, vertically movable wedges adapted to be forced between each leaf spring and its said casing to effect lateral movement of its said latch part away from the correlated plunger, arms rigid with said cross shaft and pivoted to said wedges for actuating same, and means for limiting the rocking of said cross shaft in a direction to lift said wedges, said basket-like bottom being located beneath the bus in front of the front wheels.

FREDERICK W. O'CONNOR.

REFERENCES CITED

The following references are of record in the file of this patent:

UNITED STATES PATENTS

| Number | Name | Date |
| --- | --- | --- |
| 806,561 | O'Connor | Dec. 5, 1905 |
| 807,490 | O'Connor | Dec. 19, 1905 |

FOREIGN PATENTS

| Number | Country | Date |
| --- | --- | --- |
| 145,754 | Germany | Nov. 11, 1903 |